(12) United States Patent
Ho

(10) Patent No.: US 10,320,056 B2
(45) Date of Patent: Jun. 11, 2019

(54) ANTENNA STRUCTURE

(71) Applicant: HON HAI PRECISION INDUSTRY CO., LTD., New Taipei (TW)

(72) Inventor: Chao-Wei Ho, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/690,284

(22) Filed: Aug. 30, 2017

(65) Prior Publication Data
US 2019/0051973 A1  Feb. 14, 2019

(30) Foreign Application Priority Data

Aug. 8, 2017  (CN) .......................... 2017 1 0673234

(51) Int. Cl.
| | |
|---|---|
| *H01Q 1/12* | (2006.01) |
| *H01Q 1/22* | (2006.01) |
| *H01Q 21/24* | (2006.01) |
| *H01Q 21/28* | (2006.01) |
| *H01Q 21/00* | (2006.01) |
| *H01Q 1/36* | (2006.01) |
| *H04B 1/44* | (2006.01) |

(52) U.S. Cl.
CPC ............ *H01Q 1/2291* (2013.01); *H01Q 1/36* (2013.01); *H01Q 21/0006* (2013.01); *H01Q 21/24* (2013.01); *H01Q 21/28* (2013.01); *H04B 1/44* (2013.01)

(58) Field of Classification Search
CPC ........ H01Q 1/2291; H01Q 1/36; H01Q 21/28; H01Q 21/24; H01Q 21/0006; H04B 1/44
USPC .................................................. 343/878, 718
See application file for complete search history.

(56) References Cited

U.S. PATENT DOCUMENTS

| | | | | |
|---|---|---|---|---|
| 5,926,075 | A * | 7/1999 | Hayashi | ................... H01P 1/15 333/101 |
| 7,170,462 | B2 * | 1/2007 | Ihara | ...................... G04G 21/04 343/718 |
| 2014/0217564 | A1 * | 8/2014 | Gaynor | ................. H01L 21/565 257/664 |

* cited by examiner

*Primary Examiner* — Jean B Jeanglaude
(74) *Attorney, Agent, or Firm* — ScienBiziP, P.C.

(57) ABSTRACT

An antenna structure of multi-band frequency and simple structure includes a base plate, a supporting portion and an antenna mounted on the supporting portion. The base plate has a signal source thereon. The antenna has an input end. The antenna includes a first antenna, a second antenna and a connecting portion coupled with the first antenna and the second antenna, the antenna also has a first switch portion, a second switch portion and a third switch portion, the base plate has a first circuit and a second circuit. The input end is mounted on the connecting portion, the first switch portion is mounted between the signal source and the input end, the second switch portion is mounted on the first antenna, and the third switch portion is mounted on the second antenna.

14 Claims, 4 Drawing Sheets

ANTENNA STRUCTURE

CROSS-REFERENCE TO RELATED APPLICATIONS

This application claims priority to Chinese Patent Application No. 201710673234.6 filed on Aug. 8, 2017, the contents of which are incorporated by reference herein.

FIELD

The subject matter herein generally relates to an antenna structure.

BACKGROUND

Communication technology is widely used in a smart phone. In order to satisfy a variety of communication function, multiple of antennas are mounted on the smart phone, such as WiFi antennas, GPS antennas, LTE antenna, NFC antenna etc. However, a spacer of the smart phone for mounting the antenna is limited. If multiple antennas are mounted in the smart phone, the multiple antennas may not be mounted in the spacer. Further, multiple antennas also may be influenced by each other so that function of the antennas may be affected.

BRIEF DESCRIPTION OF THE DRAWINGS

Implementations of the present technology will now be described, by way of example only, with reference to the attached figures.

DETAILED DESCRIPTION OF EMBODIMENTS

It will be appreciated that for simplicity and clarity of illustration, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts have been exaggerated to better illustrate details and features of the present disclosure. The description is not to be considered as limiting the scope of the embodiments described herein.

Several definitions that apply throughout this disclosure will now be presented. The term "comprising" means "including, but not necessarily limited to"; it specifically indicates open-ended inclusion or membership in a so-described combination, group, series and the like. The term "coupled" is defined as connected, whether directly or indirectly through intervening components, and is not necessarily limited to physical connections. The connection can be such that the objects are permanently connected or releasably connected.

Figure 1:
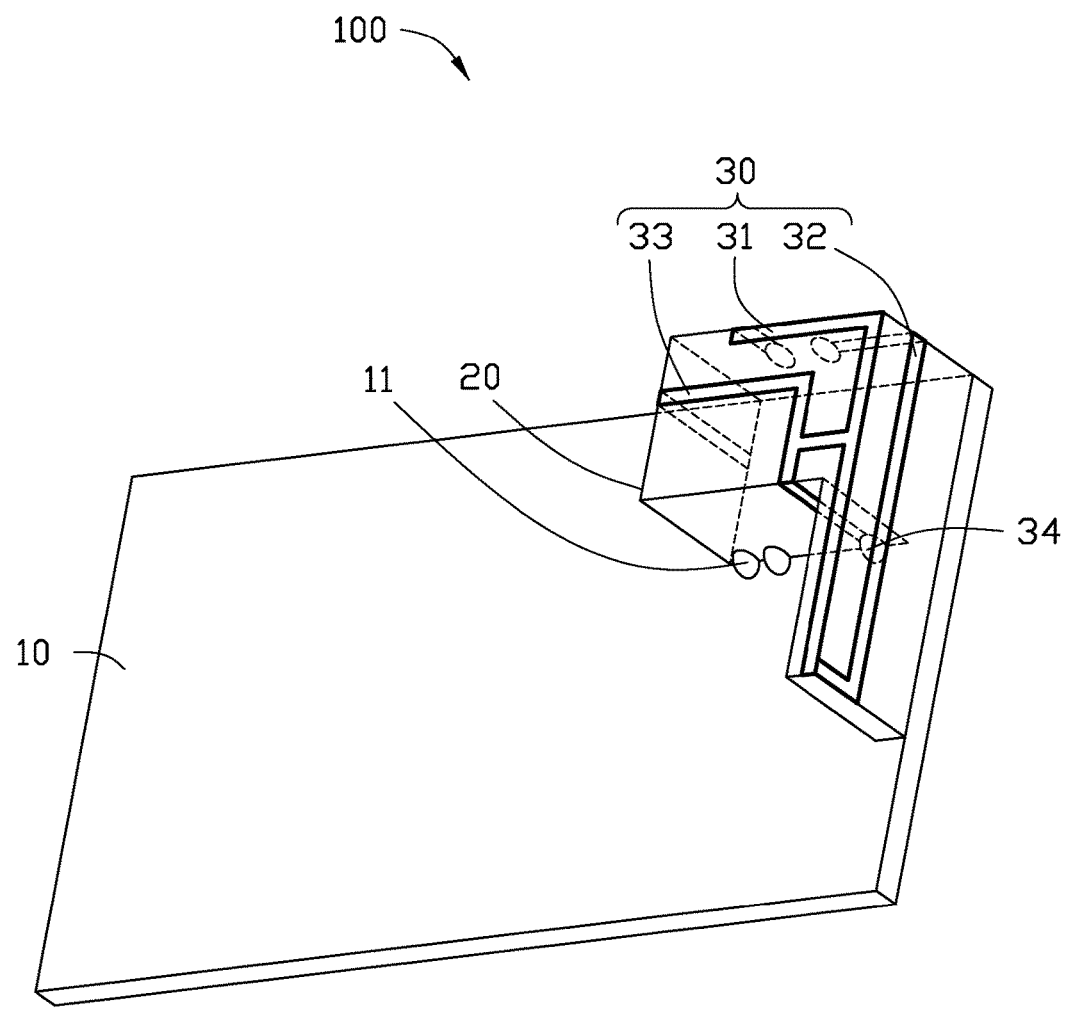
FIG. 1 is an isometric view of an antenna structure of the present disclosure.

Referring to FIG. 1, an antenna structure 100 of the present disclosure includes a base plate 10, a supporting portion 20 and antenna 30 mounted on the supporting portion 20.

In the exemplary embodiment, the base plate 10 is a printed circuit board (PCB). The base plate 10 has a signal source 11 thereon. The signal source 11 can export a signal from the base plate 10 to the antenna 30.

Figure 2:
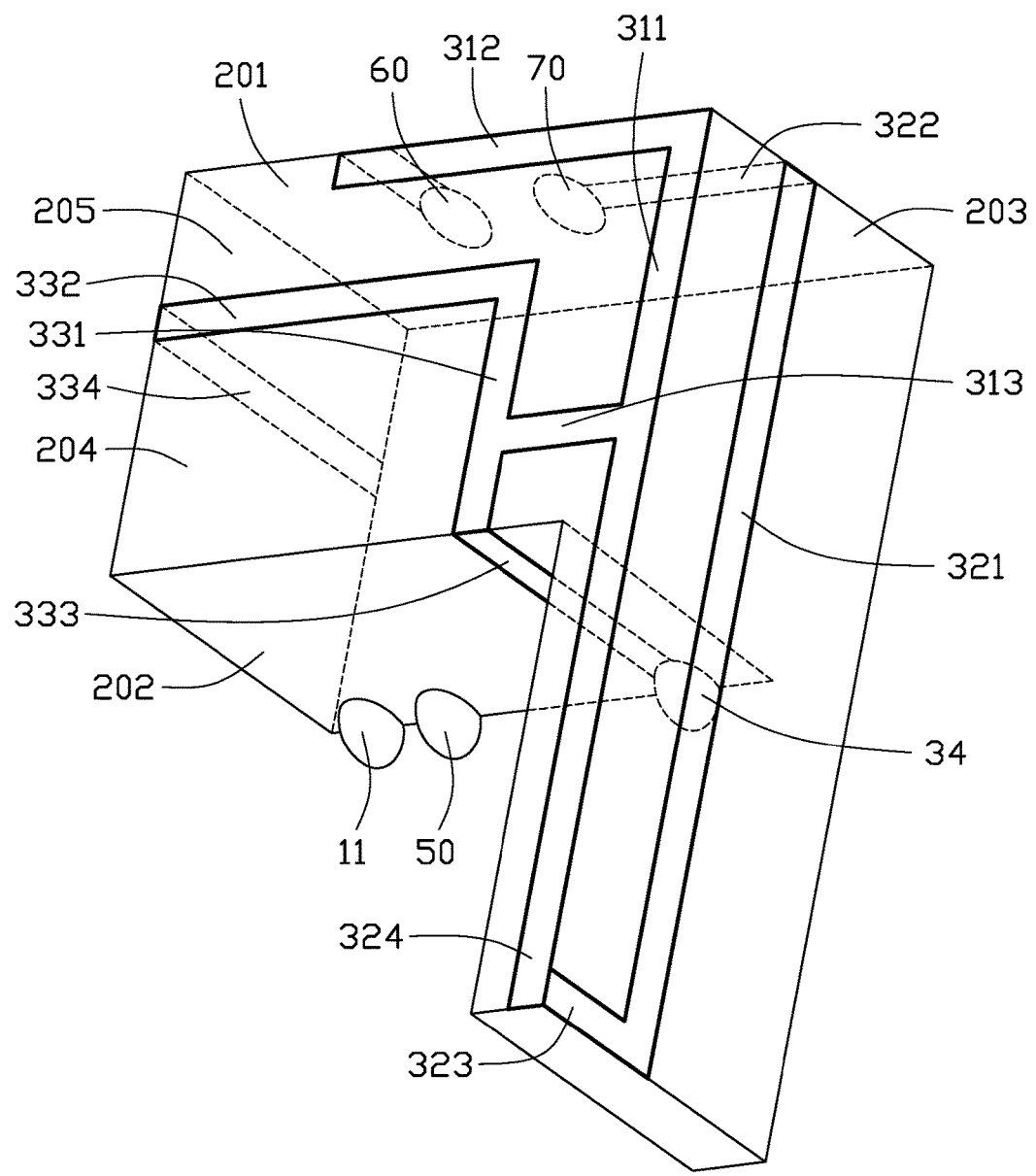
FIG. 2 is an isometric view of the antenna structure of FIG. 1 removing a base plate of the present disclosure.

Also referring to FIG. 2, the supporting portion 20 is mounted on the base plate 10 for supporting and fixing the antenna 30. The supporting portion 20 is T shaped.

The supporting portion 20 has a first surface 201, a second surface 202 opposite to the first surface 201, a third surface 203, a fourth surface 204 opposite to the third surface 203, and a top surface 205 parallel with the base plate 10. The fourth surface 204 further connects perpendicularly to the first surface 210 and the second surface 202. The first surface 201, the second surface 202, the third surface 203 and the fourth surface 204 are perpendicular to the base plate 10.

The antenna 30 includes a first antenna 31, a second antenna 32 and a connecting portion 33.

The first antenna 31 is U shaped and is mounted on the top surface 205 of the supporting portion 20. The first antenna 31 includes a first portion 311, a second portion 312 and a third portion 313. The second portion 312 and the third portion 313 are respectively extended from two opposite ends of the first portion 311. The first portion 311 and the second portion 312 of the first antenna 31 are mounted on edges of the top surface 205. The second portion 312 is parallel with the third portion 313 of the first antenna 31. The second portion 312 and the third portion 313 are perpendicular to the first portion 311 of the first antenna 31.

In the exemplary embodiment, the first antenna 31 is WiFi 2.4G. The first antenna 31 can make frequency doubling to be WiFi 5G.

The second antenna 32 includes a main portion 321, a first extending portion 322, a second extending portion 323 and a third extending portion 324. The first extending portion 322 and the second extending portion 323 extend respectively from two ends of the main portion 321 of the second antenna 32. The third extending portion 324 extends from a tail end of the second extending portion 323.

The main portion 321 and the second extending portion 323 are mounted on the third surface 203 of the supporting portion 20. The first extending portion 322 is mounted on the first surface 201 of the supporting portion 20. The third extending portion 324 is mounted on the edge of the top surface 205 of the supporting portion 20. The first extending portion 322 and the second extending portion 323 are perpendicular with the main portion 321. The third extending portion 324 is perpendicular with the second extending portion 323 and parallel with the main portion 321. Further, the third extending portion 324 of the second antenna 32 is collinear with the first portion 311 of the first antenna 31. A tail end of the third extending portion 324 connects with the third portion 313 of the first antenna 31. In the exemplary embodiment, the second antenna 32 is GPS 1.575 GHZ.

The connecting portion 33 includes a first connecting portion 331, a second connecting portion 332, a third connecting portion 333, a fourth connecting portion 334. The second connecting portion 332 and the third connecting portion 333 respectively extend from two ends of the first connecting portion 331. The fourth connecting portion 334 extends from an end of the second connecting portion 332.

The first connecting portion 331 and the second connecting portion 332 are mounted on the top surface 205 of the supporting portion 20. The third connecting portion 333 is mounted on the second surface 202 of the supporting portion 20. The fourth connecting portion 334 is mounted on the fourth surface 204 of the supporting portion 20.

Further, the first connecting portion 331 of the connecting portion 33 is perpendicular to the third portion 313 of the first antenna 31. The third connecting portion 333 is perpendicular to the first connecting portion 331 of the connecting portion 33. The second connecting portion 332 is perpendicular to the first connecting portion 331 of the connecting portion 33.

Further, the antenna 30 has an input end 34. The input end 34 connects with an end of the third connecting portion 333 of the connecting portion 33.

Further, the antenna structure 100 of the present disclosure have a first switching portion 50, a second switching portion 60 and a third switch portion 70. The first switch portion 50 is mounted between the signal source 11 of the base plate 10 and the input end 34 of the antenna 30. The first switch portion 50 is coupled with the base plate 10. The second switch portion 60 is mounted on an end of the second portion 312 of the first antenna 31. The second switch portion 60 is coupled with the second portion 312 of the first antenna 31 and the base plate 10. The third switch portion 70 is mounted on an end of the first extending portion 322 of the second antenna 32. The third switch portion 70 is coupled with the first extending portion 322 and the base plate 10.

Figure 3:
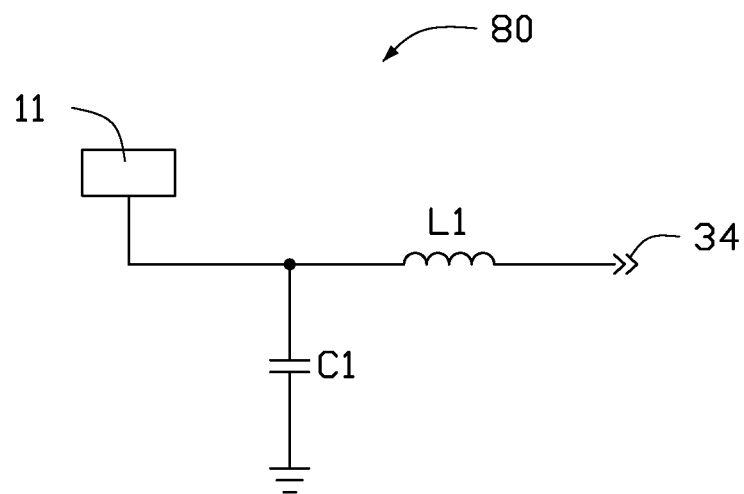
FIG. 3 is a first circuit of the antenna structure of the present disclosure.
Figure 4:
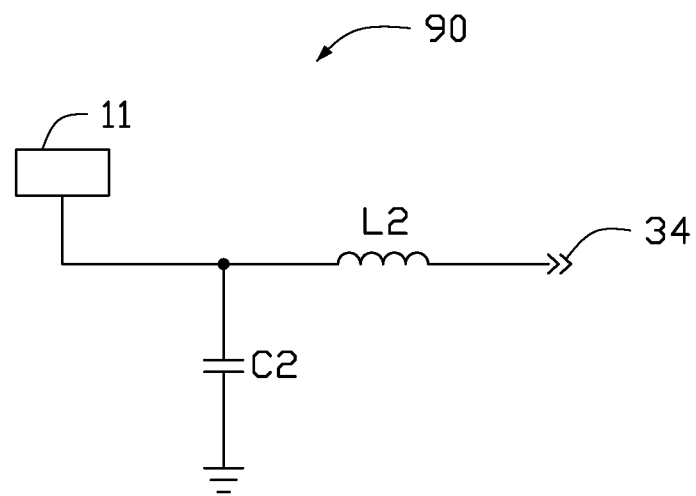
FIG. 4 is a second circuit of the antenna structure of the present disclosure.

Also referring to FIGS. 3-4, the base plate 10 of the antenna structure 100 of the present disclosure has a first circuit 80 and a second circuit 90. The first circuit 80 includes a first inductor L1 with 1.8 nH and a first capacitor C1 with 0.2 pF. Two ends of the first inductor L1 are respectively coupled with the signal source 11 of the base plate 10 and the input end 34 of the antenna 30. An end of the first capacitor C1 is coupled with the first inductor L1, another end of the first capacitor C1 is coupled with ground. The second circuit 90 includes a second inductor L2 with 3.8 nH and a second capacitor C2 with 1.1 pF. Two ends of the second inductor L2 are respectively coupled with the signal source of the base plate 10 and the input end 34 of the antenna 30. An end of the second capacitor C2 is coupled with the second inductor L2, another end of the second capacitor C2 is coupled with the ground.

The first circuit 80, the second circuit 90 together with the first switch portion 50, the second switch portion 60 and the third switch portion 70 change a frequency of the antenna 30.

Specifically, the first switch portion 50 together with the first circuit 80 match a frequency of the first antenna 31 to 230-2690 MHz (LTE Band 7/38/40/41). The first switch portion 50 together with the second circuit 90 match a frequency of the second antenna 32 to 1710~1920 MHz (LTE Band 1/2; WCDMA Band 1/2; GSM 1800/1900). The second switch portion 60 together with the first circuit 80 match the frequency of the second antenna 32 to 1920~2170 MHz (LTE Band 3/4/39; WCDMA Band 3/4). The third switch portion 70 together with the first circuit 80 match the frequency of the second antenna 32 to 1427~1469 MHz (LTE Band 11/21).

In the antenna structure 100 of the present disclosure, the first circuit 80, the second circuit 90 together with the first switch portion 50, the second switch portion 60 and the third switch portion 70 change the frequency of the antenna 30. Thus, the antenna 30 can includes multi-band frequency and also has simple structure to reduce a space for receiving thereof.

The embodiments shown and described above are only examples. Many details are often found in the art such as the other features of an antenna structure. Therefore, many such details are neither shown nor described. Even though numerous characteristics and advantages of the present technology have been set forth in the foregoing description, together with details of the structure and function of the present disclosure, the disclosure is illustrative only, and changes can be made in the detail, including in matters of shape, size and arrangement of the parts within the principles of the present disclosure up to, and including the full extent established by the broad general meaning of the terms used in the claims. It will therefore be appreciated that the embodiments described above can be modified within the scope of the claims.

What is claimed is:

1. An antenna structure comprising:
a base plate having a signal source thereon;
a supporting portion mounted on the base plate; and
an antenna mounted on the supporting portion and having an input end, the input end receiving a signal from the signal source of the base plate;
wherein the antenna comprises a first antenna, a second antenna and a connecting portion coupled with the first antenna and the second antenna, the antenna also comprises a first switch portion, a second switch portion and a third switch portion, the base plate comprises a first circuit and a second circuit; and
wherein the input end is mounted on the connecting portion, the first switch portion is mounted between the signal source and the input end, the second switch portion is mounted on the first antenna, the third switch portion is mounted on the second antenna, the first switch portion, the second switch portion, the third switch portion together with the first circuit and the second circuit change a frequency of the antenna.

2. The antenna structure of claim 1, wherein the supporting portion is T shaped, the supporting portion has a first surface, a second surface opposite to the first surface, a third surface, a fourth surface opposite to the third surface, and a top surface parallel with the base plate.

3. The antenna structure of claim 2, wherein the first antenna is U shaped and is mounted on the top surface of the supporting portion.

4. The antenna structure of claim 3, wherein the first antenna comprises a first portion, a second portion and a third portion, the second portion and the third portion are respectively extended from two opposite ends of the first portion, the second portion is parallel with the third portion, the second portion and the third portion are perpendicular to the first portion.

5. The antenna structure of claim 4, wherein the first portion and the second portion are mounted on edges of the top surface, the second switch portion is mounted on an end of the second portion and coupled with the base plate.

6. The antenna structure of claim 2, wherein the second antenna comprises a main portion, a first extending portion, a second extending portion and a third extending portion, the first extending portion and the second extending portion extend respectively from two ends of the main portion, the third extending portion extends from a tail end of the second extending portion, the third switch portion is mounted on an end of the first extending portion and coupled with the base plate.

7. The antenna structure of claim 6, wherein the first extending portion and the second extending portion are perpendicular to the main portion, the third extending portion is perpendicular to the second extending portion and parallel with the main portion.

8. The antenna structure of claim 7, wherein the main portion and the second extending portion are mounted on the third surface of the supporting portion, the first extending portion is mounted on the first surface of the supporting portion, the third extending portion is mounted on the edge of the top surface.

9. The antenna structure of claim 4, wherein the connecting portion comprises a first connecting portion, a second connecting portion, a third connecting portion and a fourth connecting portion, the second connecting portion and the third connecting portion extend respectively from two ends of the first connecting portion, the fourth connecting portion extends from an end of the second connecting portion.

10. The antenna structure of claim 9, wherein the first connecting portion is perpendicular to the third portion of the first antenna, the third connecting portion is perpendicular to the first connecting portion, the second connecting portion is perpendicular to the first connecting portion.

11. The antenna structure of claim 9, wherein the first connecting portion and the second connecting portion are mounted on the top surface of the supporting portion, the third connecting portion is mounted on the second surface of the supporting portion, the fourth connecting portion is mounted on the fourth surface of the supporting portion.

12. The antenna structure of claim 1, wherein the first antenna is WiFi 2.4G, the second antenna is GPS 1.575 GHZ.

13. The antenna structure of claim 1, wherein the first circuit comprises a first inductor and a first capacitor, two ends of the first inductor are respectively coupled with the signal source and the input end, an end of the first capacitor is coupled with the first inductor, another end of the first capacitor is coupled with ground.

14. The antenna structure of claim 13, wherein the second circuit comprises a second inductor and a second capacitor, two ends of the second inductor are respectively coupled with the signal source of the base plate and the input end, an end of the second capacitor is coupled with the second inductor, another end of the second capacitor is coupled with the ground, the first inductor and the second inductor have different self-inductance coefficients, the first capacitor and the second capacitor have different capacitance.

\* \* \* \* \*